(12) United States Patent
Wu et al.

(10) Patent No.: US 8,865,330 B2
(45) Date of Patent: Oct. 21, 2014

(54) LITHIUM-ION BATTERY

(75) Inventors: Guanglin Wu, Guangdong (CN); Huajun Sun, Guangdong (CN); Liying Pan, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 220 days.

(21) Appl. No.: 13/273,352

(22) Filed: Oct. 14, 2011

(65) Prior Publication Data

US 2012/0094172 A1    Apr. 19, 2012

(30) Foreign Application Priority Data

Oct. 16, 2010 (CN) .......................... 2010 1 0513264
Oct. 16, 2010 (CN) ....................... 2010 2 0569273 U

(51) Int. Cl.
*H01M 2/00* (2006.01)
*H01M 10/50* (2006.01)

(52) U.S. Cl.
USPC ............................................... 429/62; 429/61

(58) Field of Classification Search
None
See application file for complete search history.

(56) References Cited

U.S. PATENT DOCUMENTS

| | | | |
|---|---|---|---|
| 5,376,467 A * | 12/1994 | Abe et al. ........................... 429/7 |
| 6,617,069 B1 * | 9/2003 | Hopper et al. ................... 429/61 |
| 2002/0004162 A1 * | 1/2002 | Satoh et al. ...................... 429/94 |
| 2003/0143460 A1 * | 7/2003 | Yoshida et al. ................ 429/181 |
| 2004/0170887 A1 * | 9/2004 | Masumoto et al. ............. 429/61 |
| 2006/0127751 A1 * | 6/2006 | Woo .............................. 429/128 |

* cited by examiner

*Primary Examiner* — Cynthia K. Walls
(74) *Attorney, Agent, or Firm* — Finnegan, Henderson, Farabow, Garrett & Dunner, LLP

(57) ABSTRACT

A battery comprise: a housing made by a metal or a metal alloy; a battery core in the housing comprising a positive plate, a separator and a negative plate; an electrolyte in the housing; a cover assembly having a positive terminal electrically connected with the positive plate and a negative terminal electrically connected with the negative plate; and a protection component to prevent the housing from being corroded by the electrolyte.

20 Claims, 3 Drawing Sheets

LITHIUM-ION BATTERY

CROSS-REFERENCE TO RELATED APPLICATION

The present application claims priority to and benefits of Chinese Patent Application No. 201010513264.9, filed with the State Intellectual Property Office of the People's Republic of China (SIPO) on Oct. 16, 2010, and Chinese Patent Application No. 201020569273.5, filed with the State Intellectual Property Office of the People's Republic of China (SIPO) on Oct. 16, 2010, the entire contents of both of which are hereby incorporated by reference.

TECHNICAL FIELD

The present disclosure relates to energy storage, more particularly to a lithium-ion battery.

BACKGROUND

At present, as shown in FIG. 1, a conventional lithium-ion battery may comprise a housing 4', a battery core 3', and an electrolyte in the housing 4'. The battery core 3' has a positive terminal 1' and a negative terminal 2'; an insulating component 5' is disposed between the electric terminal 1' or 2' and the housing 4'. The housing 4' is just a container, and does not participate in the electrochemical reaction of the lithium-ion battery.

In the prior art, the housing 4' is made of metal materials, and may be corroded by the electrolyte solution (including lithium salts, additives, and organic solvents). The corrosion of the metal housing 4' may reduce the lifespan of the battery, and may cause leakage or other safety issues.

SUMMARY

The present disclosure is directed to solving at least one of the problems existing in the prior art. A lithium battery is needed, which may comprise: a housing made of a metal or a metal alloy; a battery core in the housing, comprising a positive plate, a separator and a negative plate; an electrolyte in the housing; a cover assembly having a positive terminal electrically connected with the positive plate and a negative terminal electrically connected with the negative plate; and a protection component to prevent the housing from being corroded by the electrolyte.

In one embodiment, the protection component is disposed between the negative terminal and the cover assembly. In another embodiment, the protection component is disposed between the negative terminal and the housing.

In one embodiment, the protection component comprises a first terminal and a second terminal; the first terminal is electrically connected with the negative terminal, and the second terminal is electrically connected with a part of the cover assembly.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

Exemplary embodiments of the present disclosure will be described in detail based on the following figures.

DETAILED DESCRIPTION OF THE EMBODIMENTS

Figure 1:
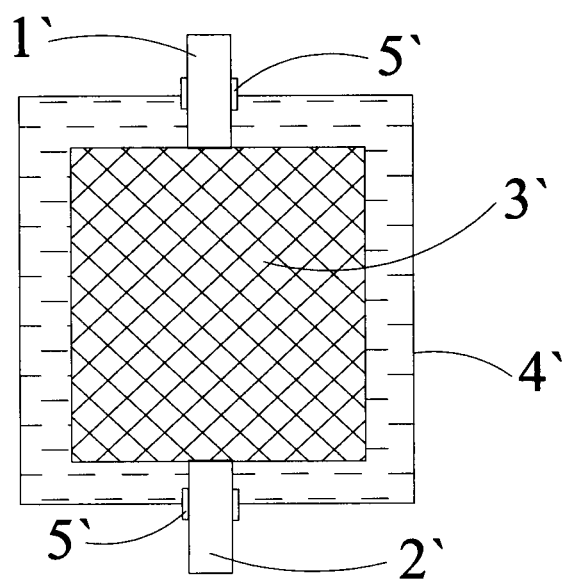
FIG. 1 shows a schematic view of a lithium battery in the prior art.

It will be appreciated by those of ordinary skill in the art that the disclosure may be embodied in other specific forms without departing from the spirit or essential characters thereof. The presently disclosed embodiments are therefore considered in all respects to be illustrative and not restrictive.

In some embodiments, a battery comprises:
a housing made by a metal or a metal alloy;
a battery core in the housing, comprising a positive plate, a separator and a negative plate;
an electrolyte in the housing;
a cover assembly having a positive terminal electrically connected with the positive plate and a negative terminal electrically connected with the negative plate; and
a protection component to prevent the housing from being corroded by the electrolyte.

In one embodiment, the protection component is disposed between the negative terminal and the cover assembly. In another embodiment, the protection component is disposed between the negative terminal and the housing.

In some embodiments, the positive terminal and the negative terminal are insulated from each other and both connected with the cover assembly. In some embodiments, the cover assembly comprises a first through hole for coupling the positive terminal, and a first insulating part between the positive terminal and the first through hole; and a second through hole for coupling the negative terminal, and a second insulating part between the negative terminal and the second through hole.

In some embodiments, the cover assembly comprises a first cover plate disposed at a first opening end of the housing, and a second cover plate disposed at a second opening end of the housing, wherein the positive terminal is coupled to the first cover plate, and the negative terminal is coupled to the second cover plate.

In some embodiments, the protection component comprises a first terminal and a second terminal; the first terminal is electrically connected with the negative terminal, and the second terminal is electrically connected with a part of the cover assembly.

In some embodiments, the protection component comprises an insulating layer on its surface.

In some embodiments, the protection component may comprise one or more chosen from a resistor, for example, a PTC resistor, or a fuse.

In one embodiment, the protection component comprises a resistor, and the resistance of the resistor ranges from about 1 KΩ to 1000 KΩ. In another embodiment, the protection component comprises a fuse, and the limiting current of the fuse is greater than about 100 A. In yet another embodiment, the protection component comprises a PTC resistor, wherein the zero-power resistance of the PTC resistor ranges from about 1 mohm to 100 mohm, and the maximum conducting current of the PTC resistor ranges from about 10 A to 100 A.

The housing of the battery can be of any shape in this art, for example, prismatic or cylindrical. The housing may be made of aluminum, steel, nickel, or an alloy thereof.

In one embodiment, the cover assembly can be made of the same metal material as the battery housing; in another embodiment, they are made of different materials.

The shape of the cover assembly may be matched with the shape of the housing to form a sealed structure. In one embodiment, the housing has only one opening end and the cover assembly has one cover plate matched with the opening end to form a sealed structure. In another embodiment, the housing has two opening ends, and the cover assembly comprises a first and a second cover plates matched with the two opening ends respectively to form a sealed structure.

In one embodiment, the cover assembly comprises a first cover plate disposed at a first opening end of the housing, and a second cover plate disposed at a second opening end of the housing, wherein the positive terminal is coupled to the first cover plate, and the negative terminal is coupled to the second cover plate.

In some embodiments, the positive plate may include a positive substrate and a positive material coated on the positive substrate; the positive material and the coating method are well-known in this field.

In some embodiments, the negative plate may include a negative substrate and a negative material coated on the negative substrate; the negative material and the coating method are well-known in this field.

The battery core may be prepared by winding or laminating the positive plate, the separator and the negative plate in turns; the winding or laminating methods are well-known in this field.

The positive plate may include a positive tab; and the negative plate may include a negative tab. In one embodiment, the tabs may be welded on the electrode plates. In another embodiment, the tabs may be formed by the positive substrate or the negative substrate respectively. The method to prepare the tabs may include applying the active material of the electrode plate along a width direction of the electrode substrate, leaving two uncoated regions at two ends of each electrode substrate along the width direction. One uncoated region of the positive substrate is exposed out of the separator at one end of the battery core, while one uncoated region of the negative substrate is exposed out of the separator at the other end of the battery core. The exposed positive substrate is pressed and electrically connected to form a positive tab, and the exposed negative substrate is pressed and electrically connected to form a negative tab. The positive tab is electrically connected with the positive terminal, and the negative tab is electrically connected with the negative terminal.

In one embodiment, the tabs are welded on the electrode plates. The positive tab and the negative tab can be disposed at the same end of the battery core, or can also be disposed at two ends of the battery core respectively. The cover assembly may include one or two cover plates accordingly, and thus the positive terminal and the negative terminal may be disposed at the same cover plate, or be disposed at the two cover plates respectively.

In another embodiment, the tabs may be formed by the positive substrate and the negative substrate respectively. The positive tab and the negative tab are disposed at two ends of the battery core respectively. The cover assembly includes two cover plates accordingly. The positive terminal and the negative terminal are disposed at the two cover plates respectively.

In some embodiments, the positive and negative tabs are respectively electrically connected with the positive and negative terminals directly. In other embodiments, the positive and negative tabs are respectively electrically connected with the positive and negative terminals via a positive or negative flexible connecting plate.

In some embodiments, the flexible connecting plates may be made of multi-layer metal foil. The positive flexible connecting plate connected to the positive tab may be made of multi-layer aluminum foil. The negative flexible connecting plate connected to the negative tab may be made of multi-layer copper foil.

In some embodiments, the flexible connecting plates may be modified by annealing treatment to enhance the toughness.

In some embodiments, the flexible connecting plate has a bending part and a bending guidance piece set at the bending part. One end of the flexible connecting plate is connected to an outer side of the corresponding positive or negative tab; the outer side is the distal side of the tab away from the positive or negative terminal. The other end of the flexible connecting plate is connected to an outer side of the corresponding positive or negative terminal; the outer side is the distal side of the positive or negative terminal away from the tab. The tab is covered by the flexible connecting plate at the bending part.

The bending guidance piece includes an arc and a bar; the arc forms the bending part, and the bar is connected to the flexible connecting plate. In one embodiment, the arc and the bar are one-body formed; in another embodiment, the arc is jointed to the bar.

The other end of the positive or negative terminal extends out of the corresponding positive or negative cover plate.

The cover plate comprises a first through hole for coupling the positive terminal, and a first insulating part between the positive terminal and the first through hole. Then the positive terminal is thus insulated from the cover plate.

Accordingly, the cover plate may comprise a second through hole for coupling the negative terminal, and a second insulating part between the negative terminal and the second through hole.

In some embodiments, the cover assembly further comprises a cover protector on the cover plate.

In some embodiments, the cover protector has insulating, flame retardant, and electrolyte resistant properties. The material of the cover protector can be plastics, rubbers, or resins, wherein the plastics may include one or more materials chosen from but not limited to perfluoroalkoxy (PFA), poylethersulphone (PES) and modified polypropylene (PP), the rubbers may include but not limited to ethylene propylene diene monomer (EPDM), and the resins may include but not limited to epoxy resins, or modified phenol-formaldehyde resins. In one embodiment, the cover protector is made of rubbers.

Accordingly, the cover protector has through holes for coupling the positive and negative terminals. The shape of the cover protector can be matched for sealing the cover plate and the positive and negative terminals.

In some embodiments, the cover protector has a multi-part structure, for example, including two parts set apart from the through hole, which may be easy in assembly to couple the positive and negative terminals.

In some embodiments, the multi-parts are interlocked to form the cover protector; the shape of the interlock can be triangular, trapezoidal, square, rectangular or a "U" shape.

In some embodiments, the cover protector further comprises an air opening coupled to a safety valve of the battery. In one embodiment, the air opening has a cross grating structure.

In some embodiments, the cover plate has a boss on its edge.

In some embodiments, the positive and negative terminals may include a groove, wherein the positive and negative terminals may be broken from the groove when the battery is shocked by outside forces.

In some embodiments, the groove can be one or more cuts made by stamping; the depth of the groove may range from about 10% to 95% of the thickness of the positive and negative terminals; the width of the groove may range from about 50% to 500% of the width of the positive and negative terminals.

In some embodiments, the thickness of the positive and negative terminals ranges from about 0.2 mm to about 20 mm; in one embodiment, it is about 2.5 mm.

In some embodiments, the positive and negative terminals may be made of pure cooper or pure aluminum. In one embodiment, the positive and negative terminals are made of pure cooper, wherein the depth of the groove may range from about 50% to 95% of the thickness of the positive and negative terminals, and the width of the groove may range from about 100% to 500% of the width of the positive and negative terminals. In another embodiment, the positive and negative terminals are made of pure aluminum, wherein the depth of the groove may range from about 30% to 80% of the thickness of the positive and negative terminals, and the width of the groove may range from about 100% to 300% of the width of the positive and negative terminals.

In some embodiments, the groove is filled with a filler having elasticity, conductivity and a certain bonding strength. The filler can be made of tin, conductive plastics, or conductive rubbers.

In one embodiment, the protection component is disposed between the negative terminal and the cover assembly. In another embodiment, the protection component is disposed between the negative terminal and the housing.

In some embodiments, the protection component comprises a first terminal and a second terminal; the first terminal is electrically connected with the negative terminal, and the second terminal is electrically connected with a part of the cover assembly.

In some embodiments, the protection component further comprises an insulating layer on its surface. The insulating layer can be made of an insulating coating, insulating ink, or insulating material coated on the protection component. In one embodiment, the insulating layer is the cover protector mentioned above made by injection molding.

In some embodiments, the protection component comprises one or more elements selected from a resistor, for example, a PTC resistor, or a fuse.

In one embodiment, the protection component comprises a resistor, and the resistance of the resistor ranges from about 1 KΩ to 1000 KΩ.

In another embodiment, the protection component comprises a fuse, and the limiting current of the fuse is greater than about 100 A.

In yet another embodiment, the protection component comprises a PTC resistor, wherein the zero-power resistance of the PTC resistor ranges from about 1 mohm to 100 mohm, and the maximum conducting current of the PTC resistor ranges from about 10 A to 100 A.

Embodiment 1

Figure 2:
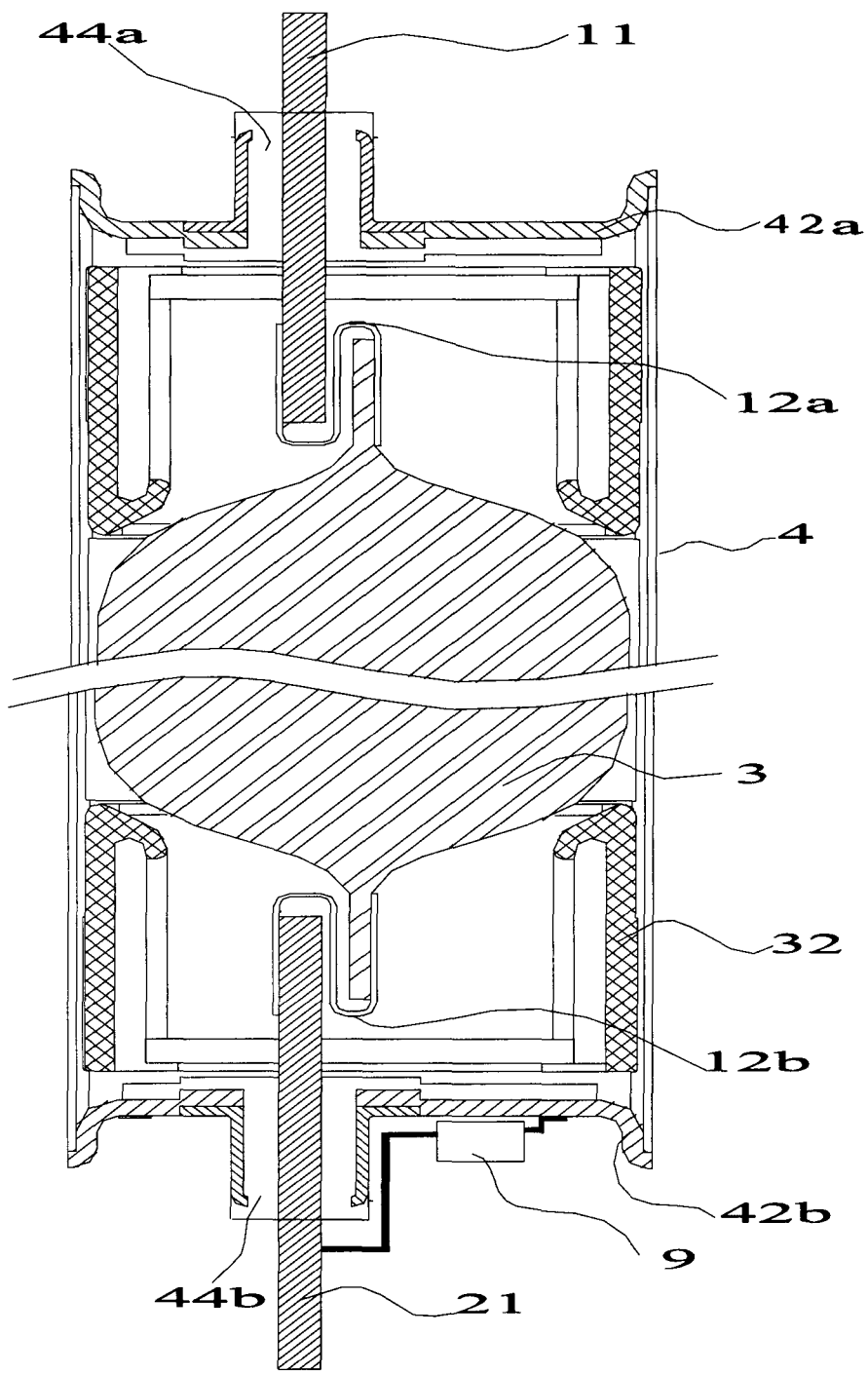
FIG. 2 shows a schematic view of a lithium battery according to one embodiment of the present disclosure.

As shown in FIG. 2, a battery comprises a housing 4, a cover assembly 42 including an upper cover plate 42a and a lower cover plate 42b, a battery core 3 and an electrolyte (not shown).

The housing 4 has two openings sealed by the upper cover plate 42a and the lower cover plate 42b to form a cavity. The battery core 3 and the electrolyte are disposed in the cavity, and the battery core 3 is soaked in the electrolyte.

The battery core 3 comprises a positive plate, a separator and a negative plate.

The positive plate includes a positive material and a positive substrate. The positive material is applied along a width direction of the positive substrate, with uncoated regions left at two ends along the width direction. One uncoated region of the positive substrate is exposed out of the separator; and the exposed positive substrate is pressed and electrically connected to form a positive tab.

Accordingly, the negative plate includes a negative material and a negative substrate. The negative material is applied along a width direction of the negative substrate, with uncoated regions left at two ends along the width direction. One uncoated region of the negative substrate is exposed out of the separator, and the exposed negative substrate is pressed and electrically connected to form a negative tab.

As shown in FIG. 2, the positive and negative tabs are formed at two ends of the battery core 3.

The battery core 3 is held in the cavity by a pair of spacers 32.

The positive tab is connected to a positive terminal 11 via a flexible connecting plate 12a. The upper cover plate 42a has a first through hole for coupling the positive terminal 11. A first insulating part 44a is disposed between the positive terminal 11 and the first through hole.

The negative tab is connected to a negative terminal 21 via a flexible connecting plate 12b. The lower cover plate 42b has a second through hole for coupling the negative terminal 21. A second insulating part 44b is disposed between the negative terminal 21 and the second through hole.

A resistor 9 is disposed on the lower cover plate 42b, wherein one end of the resistor 9 is electrically connected with the lower cover plate 42b, and the other end of the resistor 9 is electrically connected with the negative terminal 21. The resistor 9 has an insulating ink coated thereon.

The resistance of the resistor 9 is about 1 KΩ.

The lithium-ion battery of Embodiment 1 is labeled as A1.

Embodiment 2

The lithium-ion battery of Embodiment 2 is substantially similar to that of Embodiment 1, with the exception that the protection component is a fuse set on the lower cover plate, wherein one end of the fuse is electrically connected with the lower cover plate, and the other end of the fuse is electrically connected with the negative terminal.

The lithium-ion battery of Embodiment is labeled as A2.

Embodiment 3

Figure 3:
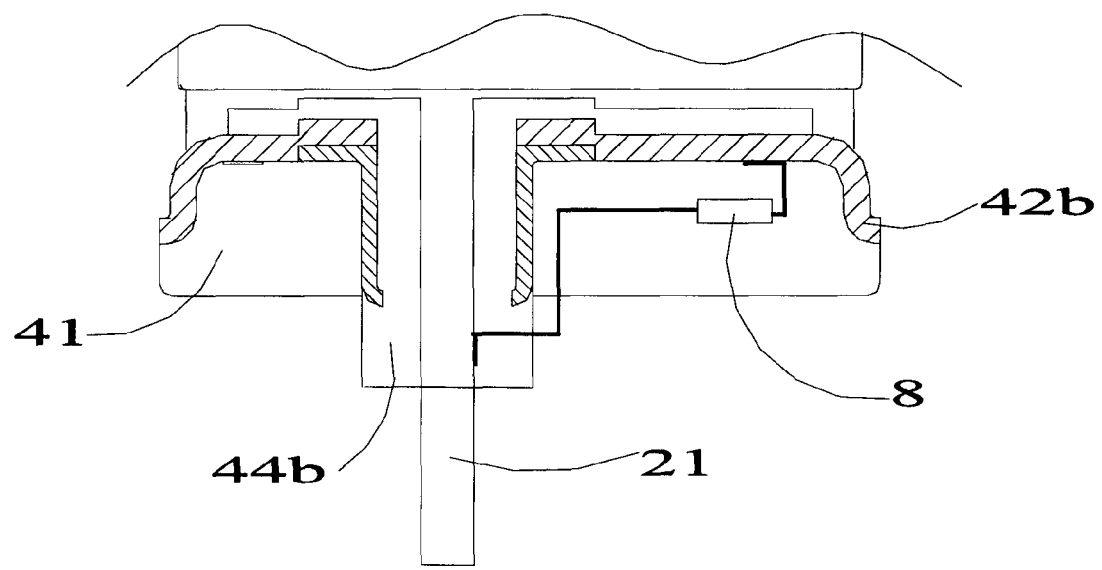
FIG. 3 shows a partial enlargement of a lithium battery according to another embodiment of the present disclosure.

As shown in FIG. 3, the lithium-ion battery of Embodiment 3 is substantially similar to that of Embodiment 1, with the exception that the protection component is a PTC resistor 8, wherein one end of the PTC resistor 8 is electrically connected with the lower cover plate 42b, and the other end of the PTC resistor 8 is electrically connected with the negative terminal 21.

The cover assembly 42 further comprises a cover protector 41 on the cover plate. The cover protector 41 has through holes for coupling the positive and negative terminals. The shape of the cover protector 41 can be matched for sealing the cover plate and the positive and negative terminals.

The PTC resistor 8 is packaged into the cover protector 41.
The lithium-ion battery of Embodiment 3 is labeled as A3.

COMPARATIVE EXAMPLE 1

A battery comprises a housing, a cover assembly including an upper cover plate and a lower cover plate, a battery core and an electrolyte.

The housing has two openings sealed by the upper cover plate and the lower cover plate to form a cavity. The battery core and the electrolyte are disposed in the cavity, and the battery core is soaked in the electrolyte.

The battery core comprises a positive plate, a separator and a negative plate.

The positive plate includes a positive material and a positive substrate. The positive material is applied along a width direction of the positive substrate, with uncoated regions left at two ends along the width direction. One uncoated region of the positive substrate is exposed out of the separator, and the exposed positive substrate is pressed and electrically connected to form a positive tab.

Accordingly, the negative plate includes a negative material and a negative substrate. The negative material is applied along a width direction of the negative substrate, with uncoated regions left at two ends along the width direction. One uncoated region of the negative substrate is exposed out of the separator, and the exposed negative substrate is pressed and electrically connected to form a negative tab.

The positive and negative tabs are formed at the two ends of the battery core.

The battery core is held in the cavity by a pair of spacers.

The positive tab is connected to a positive terminal via a flexible connecting plate. The upper cover plate has a first through hole for coupling the positive terminal. A first insulating part is disposed between the positive terminal and the first through hole.

The negative tab is connected to a negative terminal via a flexible connecting plate. The lower cover plate has a second through hole for coupling the negative terminal. A second insulating part is disposed between the negative terminal and the second through hole.

The lithium-ion battery of Comparative example 1 is labeled as AC1.

TESTING EXAMPLE 1

The lithium-ion batteries A1, A2, A3 and AC1 were charged and discharged at 1 C rate for 500 cycles, and then the corrosion of the metal housing in each battery was checked.

The testing results are listed in Table 1.

TABLE 1

| Battery | Corrosion of the housing |
|---|---|
| A1 | No corrosion |
| A2 | No corrosion |
| A3 | No corrosion |
| AC1 | Welding seam corrosion |

As shown in Table 1, the lithium batteries of the present disclosure A1, A2 and A3 had better corrosion resistance.

Many modifications and other embodiments of the present disclosure will come to mind to one skilled in the art to which the present disclosure pertains having the benefit of the teachings presented in the foregoing description. It will be apparent to those skilled in the art that variations and modifications of the present disclosure may be made without departing from the scope or spirit of the present disclosure. Therefore, it is to be understood that the disclosure is not to be limited to the specific embodiments disclosed and that modifications and other embodiments are intended to be included within the scope of the appended claims.

What is claimed is:

1. A battery comprising:
   a housing made by a metal;
   a battery core in the housing, comprising a positive plate, a separator and a negative plate;
   an electrolyte in the housing;
   a cover assembly having a positive terminal electrically connected with the positive plate and a negative terminal electrically connected with the negative plate; and
   a protection component including a resistor electrically connected between the housing and the negative terminal to prevent the housing from being corroded by the electrolyte, wherein the resistor comprises a first terminal and a second terminal, the first terminal being electrically connected with the negative terminal, and the second terminal being electrically connected to the housing.

2. The battery of claim 1, wherein the protection component is disposed between the negative terminal and the cover assembly.

3. The battery of claim 1, wherein the metal includes a metal alloy.

4. The battery of claim 3, wherein the cover assembly comprises a first through hole for coupling the positive terminal, and a first insulating part disposed between the positive terminal and the first through hole.

5. The battery of claim 3, wherein the cover assembly comprises a second through hole for coupling the negative terminal, and a second insulating part disposed between the negative terminal and the second through hole.

6. The battery of claim 1, wherein the cover assembly comprises a first cover plate disposed at a first opening end of the housing, and a second cover plate disposed at a second opening end of the housing, wherein the positive terminal is coupled to the first cover plate, and the negative terminal is coupled to the second cover plate.

7. The battery of claim 1, wherein the protection component comprises an insulating layer formed thereon.

8. The battery of claim 1, wherein the resistor comprises a PTC resistor, wherein the zero-power resistance of the PTC resistor ranges from about 1 mohm to 100 mohm, and the maximum conducting current of the PTC resistor ranges from about 10 A to 100 A.

9. The battery of claim 1, wherein the cover assembly further comprises a cover protector disposed thereon.

10. The battery of claim 1, wherein the positive plate comprises a positive tab electrically connected with the positive terminal, and the negative plate comprises a negative tab electrically connected with the negative terminal.

11. The battery of claim 10, wherein the positive tab is electrically connected with the positive terminal via a positive flexible connecting plate, and the negative tab is electrically connected with the negative terminal via a negative flexible connecting plate.

12. The battery of claim 10, wherein the positive tab and the negative tab are welded on the positive plate and the negative plate respectively.

13. The battery of claim 10, wherein the positive plate comprises a positive substrate and a positive material coated on the positive substrate, with two uncoated regions left at two ends along a width direction of the positive substrate, one uncoated region of the positive substrate being exposed out of the separator to form a positive tab; and wherein the negative plate comprises a negative substrate and a negative material coated on the negative substrate, with two uncoated regions left at two ends along a width direction of the negative substrate, one uncoated region of the negative substrate being exposed out of the separator to form a negative tab.

14. A battery comprising:
a housing made by a metal;
a battery core in the housing, comprising a positive plate, a separator and a negative plate;
an electrolyte in the housing;
a cover assembly having a positive terminal electrically connected with the positive plate and a negative terminal electrically connected with the negative plate; and
a protection component electrically connected between the housing and the negative terminal to prevent the housing from being corroded by the electrolyte, wherein the protection component comprises a first terminal and a second terminal, the first terminal being electrically connected with the negative terminal, and the second terminal being electrically connected to the housing.

15. The battery of claim 14, wherein the cover assembly comprises a first cover plate disposed at a first opening end of the housing, and a second cover plate disposed at a second opening end of the housing, wherein the positive terminal is coupled to the first cover plate, and the negative terminal is coupled to the second cover plate.

16. The battery of claim 14, wherein the protection component comprises an insulating layer formed thereon.

17. The battery of claim 14, wherein the positive plate comprises a positive tab electrically connected with the positive terminal, and the negative plate comprises a negative tab electrically connected with the negative terminal.

18. The battery of claim 17, wherein the positive tab is electrically connected with the positive terminal via a positive flexible connecting plate, and the negative tab is electrically connected with the negative terminal via a negative flexible connecting plate.

19. The battery of claim 17, wherein the positive tab and the negative tab are welded on the positive plate and the negative plate respectively.

20. The battery of claim 17, wherein the positive plate comprises a positive substrate and a positive material coated on the positive substrate, with two uncoated regions at two ends, one uncoated region of the positive substrate being exposed out of the separator to form a positive tab; and wherein the negative plate comprises a negative substrate and a negative material coated on the negative substrate, with two uncoated regions at two ends, one uncoated region of the negative substrate being exposed out of the separator to form a negative tab.

* * * * *